United States Patent
Takahashi

[11] 3,963,325
[45] June 15, 1976

[54] WIDE ANGLE LENS

[75] Inventor: Yasuo Takahashi, Tokyo, Japan

[73] Assignee: Asahi Kogaku Kogyo Kabushiki Kaisha, Tokyo, Japan

[22] Filed: Apr. 21, 1975

[21] Appl. No.: 570,150

[30] Foreign Application Priority Data
Apr. 24, 1974 Japan.............................. 49-46104

[52] U.S. Cl. ........................... 350/215; 350/176
[51] Int. Cl.² ................................. G02B 9/62
[58] Field of Search ........................ 350/215, 176

[56] References Cited
UNITED STATES PATENTS
3,037,426  6/1962  Hugues ........................ 350/215 X
FOREIGN PATENTS OR APPLICATIONS
46-41341  12/1971  Japan ........................... 350/215

Primary Examiner—Paul A. Sacher
Attorney, Agent, or Firm—Sughrue, Rothwell, Mion, Zinn & Macpeak

[57] ABSTRACT

A wide angle lens system comprising six lens components constituted by six lens elements wherein the first lens is a negative meniscus lens convex to the object, the second lens is a positive lens, the third lens is a positive lens, the fourth lens is a biconcave negative lens, the fifth lens is a positive meniscus lens convex to the image and the sixth lens is a positive lens, wherein the following conditions are satisfied;
1. $F/1.2 < |F_1| < F/0.8 \cdot F_1 < 0$
2. $F/1.8 < F_{1,2,3} < F/1.4$
3. $0.2F < d_2 < 0.45F$
4. $0.7F < (d_1 + d_2 + d_3 + d_4 + d_5 + d_6) < 0.9F$
5. $0.2 < (n_2 + n_3)/2 - n_1 < 0.32$

1 Claim, 5 Drawing Figures

FIG. 1
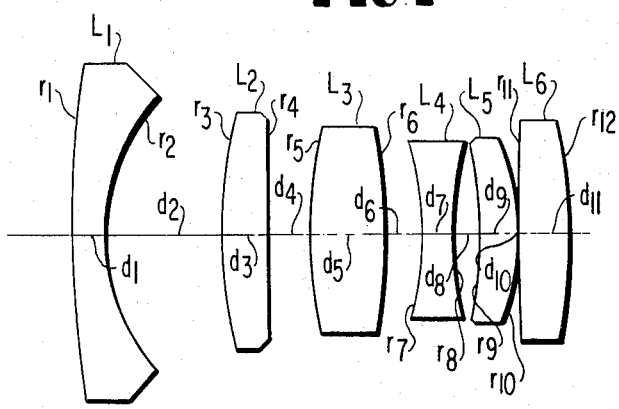
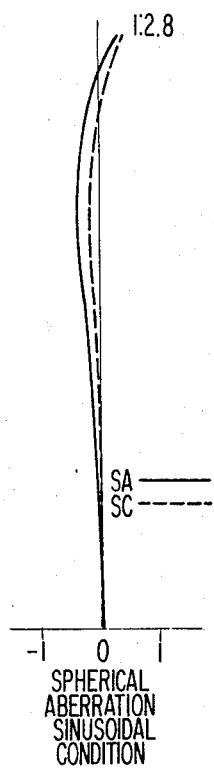
FIG. 2a
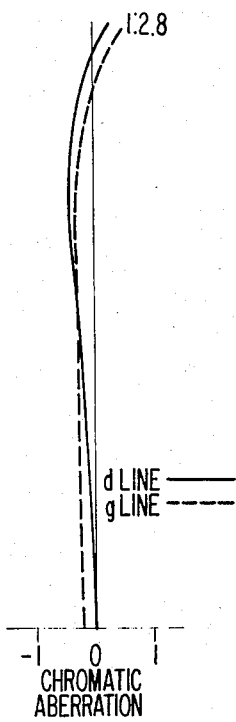
FIG. 2b
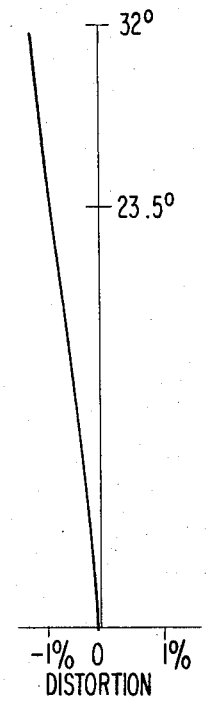
FIG. 2c
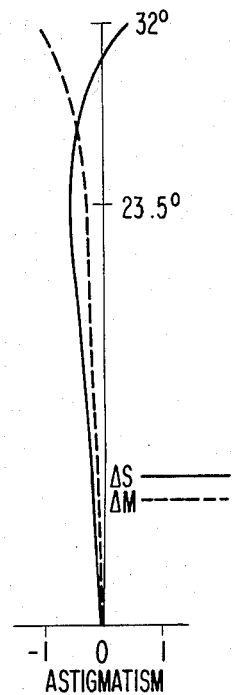
FIG. 2d

WIDE ANGLE LENS

FIELD OF THE INVENTION

The present invention relates to a retrofocus type wide angle lens the length of which is reduced. There are two ways in making the retrofocus type lens compact in size, one of which is to reduce the diameter of the lens and the other is to reduce the length of the lens system. This invention is concerned with the latter way to make the lens compact.

SUMMARY OF THE INVENTION

The present invention provides a wide angle lens system comprising six lens components constituted by six lens elements wherein the first lens is a negative meniscus lens convex to the object, the second lens is a positive lens, the third lens is a positive lens, the fourth lens is a biconcave negative lens, the fifth lens is a positive meniscus lens convex to the image and the sixth lens is a positive lens, wherein the following conditions are satisfied;

1. $F/1.2 < |F_1| < F/0.8 \cdot F_1 < 0$
2. $F/1.8 < F_{1,2,3} < F/1.4$
3. $0.2F < d_2 < 0.45F$
4. $0.7F < (d_1\ 30\ d_2 + d_3 + d_4\ 30\ d_5 + d_6) < 0.9F$
5. $0.2 < n_2 + {}_{n3/2} - n_1 < 0.32$

BRIEF DESCRIPTION OF THE DRAWINGS

The specific nature of the invention as well as other objects aspects, uses and advantages thereof, will clearly appear from the following description and from the accompanying drawing, in which:

FIG. 1 is a longitudinal view showing the lens in accordance with an embodiment of the present invention, and FIGS. 2a to 2d show aberration curves obtained by lens system in accordance with the embodiment shown in FIG. 1.

DESCRIPTION OF THE PREFERRED EMBODIMENT

Describing the construction of the lens shown in FIG. 1, the first lens $L_1$ is a negative meniscus lens convex to the object (which means that the face of the greater radius of curvature is on the object side), and the second and third lenses $L_2$ and $L_3$ are positive lenses. The fourth lens $L_4$ is a biconcave negative lens, the fifth lens $L_5$ is a positive meniscus lens convex to the image, and the sixth lens $L_6$ is a positive lens. The lens system in accordance with the present invention comprises the above six lenses $L_1$ to $L_6$ and satisfies the following conditions:

1. $F/1.2 < |F_1| < F/0.8$ . $F_1 < 0$
2. $F/1.8 < F_{1,2,3} < F/1.4$  3. $0.2F < d_2 < 0.45F$
4. $0.7F < (d_1 + d_2 + d_3 + d_4 + d_5 + d_6) < 0.9F$
5. $0.2 < (n_2 + n_3)/2 - n_1 < 0.32$ wherein the reference characters designate the following dimensions:

F: effective focal length of the whole system
$F_{1,2,...i}$: effective focal length of the lens system comprising the first to the i-th lenses
$r_j$: radii of curvature of the j-th face
$d_k$: axial air separations or thicknesses of the k-th air separation or lens thickness
$n_i$: the refractive indices for the sodium d-line of the i-th lens
$\nu_i$: Abbe numbers of the i-th lens.

The first conditions (1) are to be satisfied for obtaining the reduced length of the lens system. The degree of negativeness of the first lens is required to be increased to reduce the length of the lens system. However, if the focal length of the first lens is so short as to be less than F/1.2, the radius of curvature of the second face becomes too small and coma aberration appears. In order to eliminate the increased coma aberration, other aberrations will be increased. If the focal length of the first lens is longer than F/0.8, the purpose of obtaining a compact lens system cannot be achieved easily within the limitation of the third conditions.

The second conditions (2) are to be satisfied in connection with the first conditions to determine the positive refractive power of the second and third lenses for correcting chromatic aberration with reference to $d_6$ or the refractive index of the glass material. When $F_{1,2,3}$ is shorter than F/1.8, chromatic aberration is well corrected but the radii of curvature of the respective faces become too short and coma aberration and other aberrations will increase. Further, Petzval sum is reduced and it becomes difficult to design a wide angle lens of high performance. When the focal length is longer than F/1.4, the air separation $d_6$ must be enlarged, which results in reduction of Petzval sum and dissatisfaction of the fourth conditions (4).

The third conditions (3) are to be satisfied for making the lens system compact. If the separation $d_2$ is shorter than 0.2F, the back focal distance must be elongated by some other means in order to make the lens system be of retrofocus type, which results in dissatisfaction of the other conditions or increase in aberrations. If the separation is longer than 0.45F, it becomes difficult to reduce the length of the lens system.

The fourth conditions (4) are to be satisfied for obtaining a compact wide angle lens. If the value defined here is smaller than 0.7F, the correction of aberration becomes difficult. It it is larger than 0.9F, the overall length of the lens system becomes to long.

The fifth conditions (5) are to be satisfied for keeping the Petzval sum normal to correct for chromatic aberration in connection with Abbe numbers of the first, second and third lenses. If the value defined here becomes smaller than 0.2. the refractive index $n_1$ increases and Abbe number must be reduced, which results in an imbalance in chromatic abberation. If $n_1$ is kept as it is, $n_2$ and $n_3$ are reduced and Petzval sum increases and the radii of curvature are shortened, which results in a general degradation of aberrations. If it becomes larger than 0.32, $n_1$ decreases or $n_2$ and $n_3$ increase, which results in degradation in correction of aberrations and increase in cost of glass material and reduction of Abbe numbers. The chromatic aberration is accordingly degraded. Further, Petzval sum is decreased as a whole and the correction of aberration in a large angle becomes difficult.

For the specific embodiment of the invention shown in FIG. 1, the radii $r_1$ to $r_{12}$ and thicknesses and separations $d_1$ to $d_{11}$, along with the refractive indices $n_1$ to $n_6$ and Abbe numbers $\nu_1$ to $\nu_6$ for lenses $L_1$ to $L_6$ are given in Table 1 as follows:

Table 1

F = 100
$F_1 = -100.46 = F/-0.922$
$F_{1.2.3} = 64.31 = F/1.555$

| Lens | Radius of Curvature r | Lens Thickness or Distance d | Refractive Index n | Abbe No. |
|---|---|---|---|---|
| $L_1$ | $r_1 = 227.78$ | $d_1 = 7.14$ | $n_1 = 1.51633$ | $\nu_1 = 64.1$ |
|  | $r_2 = 44.46$ |  |  |  |
|  |  | $d_2 = 28.92$ |  |  |
| $L_2$ | $r_3 = 128.22$ | $d_3 = 11.83$ | $n_2 = 1.80610$ | $\nu_2 = 40.8$ |
|  | $r_4 = 14544.54$ |  |  |  |
|  |  | $d_4 = 9.40$ |  |  |
| $L_3$ | $r_5 = 92.53$ | $d_5 = 18.49$ | $n_3 = 1.75700$ | $\nu_3 = 47.9$ |
|  | $r_6 = -137.95$ |  |  |  |
|  |  | $d_6 = 8.74$ |  |  |
| $L_4$ | $r_7 = 81.74$ | $d_7 = 8.23$ | $n_4 = 1.80518$ | $\nu_4 = 25.4$ |
|  | $r_8 = 88.40$ |  |  |  |
|  |  | $d_8 = 5.94$ |  |  |
| $L_5$ | $r_9 = 97.45$ | $d_9 = 9.09$ | $n_5 = 1.75700$ | $\nu_5 = 47.9$ |
|  | $r_{10} = -48.29$ |  |  |  |
|  |  | $d_{10} = 0.57$ |  |  |
| $L_6$ | $r_{11} = 1008.30$ | $d_{11} = 11.37$ | $n_6 = 1.74320$ | $\nu_6 = 49.4$ |
|  | $r_{12} = -200.02$ |  |  |  |

FIG. 2a shows the spherical aberration and the sine condition,

FIG. 2b shows the chromatic aberration,

FIG. 2c shows the distortion, and

FIG. 2d shows the astigmatism of the lens system shown in FIG. 1 and defined in Table 1.

It will be apparent that the embodiment shown is only exemplary and that various modifications can be made in construction and arrangement within the scope of the invention as defined in the appended claims.

What is climed is:

1. A wide angle lens system comprising six lens components constituted by six lens elements wherein the first lens is a negaive meniscus lens convex to the object, the second lens is a positive lens, the third lens is a positive lens, the fourth lens is a biconcave negative lens, the fifth lens is a positive meniscus lens convex to the image and the sixth lens is a positive lens, wherein the following conditions are satisfied:

1. $F/1.2 < |F_1| < F/0.8 \cdot F_1 < 0$
2. $F/1.8 < F_{1.2.3} < F/1.4$
3. $0.2F < d_2 < 0.45F$
4. $0.7F < (d_1 + d_2 + d_3 + d_4 + d_5 + d_6) < 0.9F$
5. $0.2 < (n_2 + n_3/2) - n_1 < 0.32$ wherein the reference characters designate the following dimensions:

F: effective focal length of the whole system $F_{1.2....i}$: effective focal length of the lens system comprising the first to the i-th lenses $r_j$: radii of curvature of the j-th face $d_k$: axial air separations of thicknesses of the k-th air separation or lens thickness $n_i$: the refractive indices for the sodium d-line of the i-th lens $\nu_i$: Abbe numbers of the i-th lens, the radii $r_1$ to $r_{12}$, the thickness and separations $d_1$ to $d_{11}$, the refractive indices $n_1$ to $n_6$, and Abbe numbers $\nu_1$ to $\nu_6$ of said first to sixth lenses $L_1$ to $L_6$, respectively, satisfy the following conditions:

F = 100
$F_1 = -100.46 = F/-0.922$
$F_{1.2.3} = 64.31 = F/1.555$

| Lens | Radius of Curvature r | Lens Thickness or Distance d | Refractive Index n | Abbe No. |
|---|---|---|---|---|
| $L_1$ | $r_1 = 227.78$ | $d_1 = 7.14$ | $n_1 = 1.51633$ | $\nu_1 = 64.1$ |
|  | $r_2 = 44.46$ |  |  |  |
|  |  | $d_2 = 28.92$ |  |  |
| $L_2$ | $r_3 = 128.22$ | $d_3 = 11.83$ | $n_2 = 1.80610$ | $\nu_2 = 40.8$ |
|  | $r_4 = 14544.54$ |  |  |  |
|  |  | $d_4 = 9.40$ |  |  |
| $L_3$ | $r_5 = 92.53$ | $d_5 = 18.49$ | $n_3 = 1.75700$ | $\nu_3 = 47.9$ |
|  | $r_6 = -137.95$ |  |  |  |
|  |  | $d_6 = 8.74$ |  |  |
| $L_4$ | $r_7 = -81.74$ | $d_7 = 8.23$ | $n_4 = 1.80518$ | $\nu_4 = 25.4$ |
|  | $r_8 = 88.40$ |  |  |  |
|  |  | $d_8 = 5.94$ |  |  |
| $L_5$ | $r_9 = -97.45$ | $d_9 = 9.09$ | $n_5 = 1.75700$ | $\nu_5 = 47.9$ |
|  | $r_{10} = -48.29$ |  |  |  |
|  |  | $d_{10} = 0.57$ |  |  |
| $L_6$ | $r_{11} = 1008.30$ | $d_{11} = 11.37$ | $n_6 = 1.74320$ | $\nu_6 = 49.4$ |
|  | $r_{12} = -200.02$ |  |  |  |

\* \* \* \* \*